(12) United States Patent
McClain et al.

(10) Patent No.: US 6,990,812 B2
(45) Date of Patent: Jan. 31, 2006

(54) CONTROL VALVE FOR A HYDRAULIC BRAKE BOOSTER

(75) Inventors: Richard Becker McClain, South Bend, IN (US); William John Penninger, Niles, MI (US); Gary L. Doty, Berring Springs, MI (US); Timothy J. Albert, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 10/709,349

(22) Filed: Apr. 29, 2004

(65) Prior Publication Data

US 2005/0241305 A1    Nov. 3, 2005

(51) Int. Cl.
*B60T 13/20*    (2006.01)
(52) U.S. Cl. ..................... 60/551; 60/547.1
(58) Field of Classification Search ............. 60/547.1, 60/551; 91/368
See application file for complete search history.

(56) References Cited

U.S. PATENT DOCUMENTS

| 2,472,695 | A | * | 6/1949 | Chouings | 60/547.1 |
|---|---|---|---|---|---|
| 2,980,066 | A | * | 4/1961 | Stelzer et al. | 60/551 |
| 3,978,667 | A | * | 9/1976 | Ohara | 60/547.1 |
| 4,117,766 | A | | 10/1978 | Kervagoret | |
| 4,281,585 | A | | 8/1981 | Runkle | |
| 4,539,892 | A | | 9/1985 | Mackiewicz | |
| 4,625,515 | A | | 12/1986 | Myers et al. | |
| 4,986,613 | A | * | 1/1991 | Nishii et al. | 60/547.1 |
| 6,561,596 | B2 | | 5/2003 | Penninger | |
| 6,732,518 | B1 | * | 5/2004 | Wilson et al. | 60/547.1 |

* cited by examiner

*Primary Examiner*—Edward K. Look
*Assistant Examiner*—Michael Leslie
(74) *Attorney, Agent, or Firm*—Leo H. McCormick, Jr.; Warren Comstock

(57) ABSTRACT

A control valve of a hydraulic brake booster for use in a brake system. The control valve is characterized by a shuttle member having a stem on a first end and an annular projection on a second end. The stem has an annular surface thereon that is matched with an orifice from an supply chamber such that metered pressurized fluid is uniformly presented to an actuation chamber to effect a brake application while the annular projection is matched with a flange on an actuator piston such that the pressurized fluid present in the actuation chamber is uniformly metered to a reservoir.

15 Claims, 7 Drawing Sheets

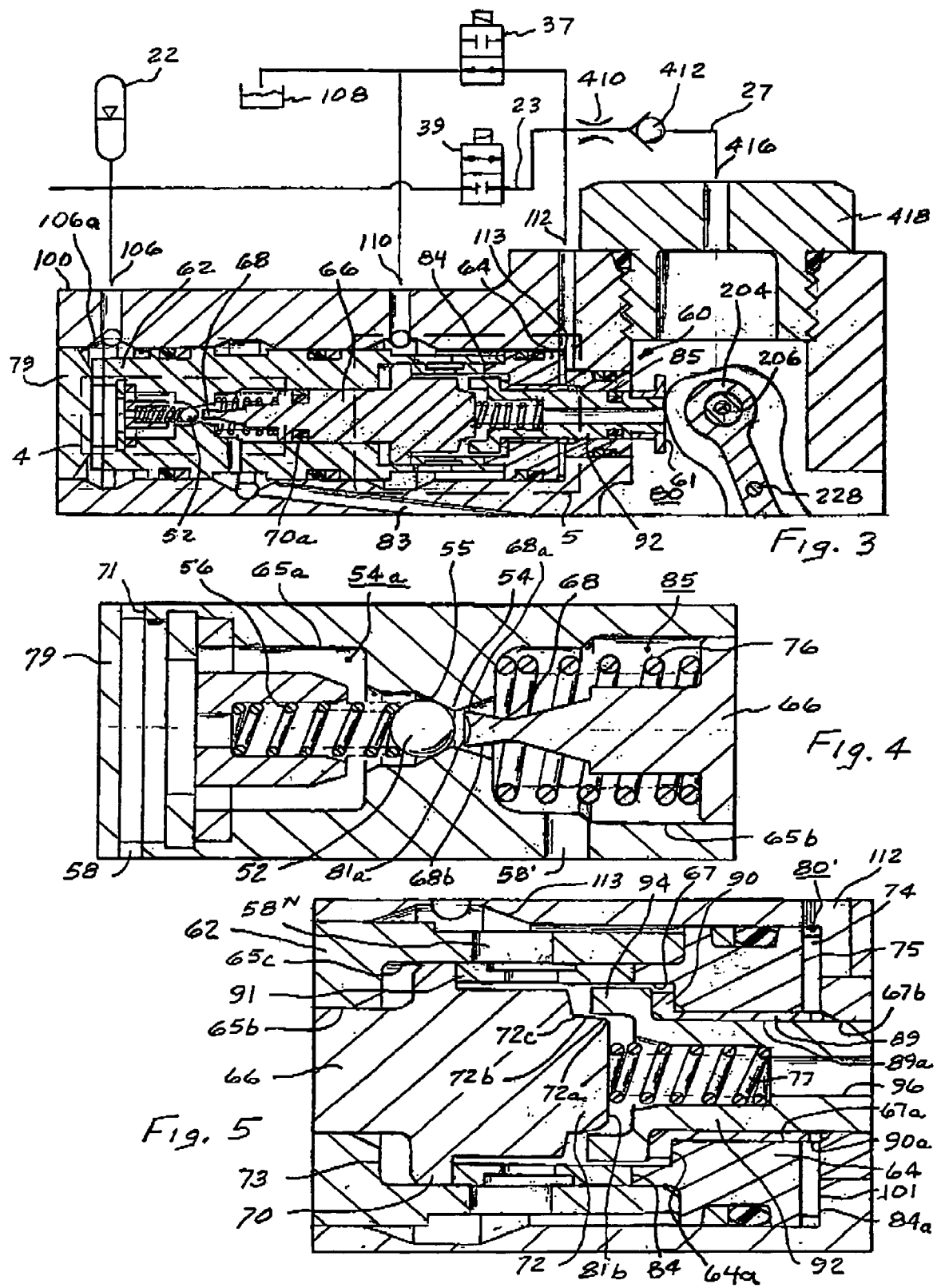

CONTROL VALVE FOR A HYDRAULIC BRAKE BOOSTER

BACKGROUND OF INVENTION

This invention relates to a control valve for a hydraulic brake booster having a shuttle member with a first end to control metering of pressurized fluid to an actuation chamber during a brake application and a second end to control metering of pressurized fluid from the actuation chamber to a reservoir on termination the brake application.

In hydraulic brake boosters of a type disclosed in U.S. Pat. Nos. 4,281,585; 4,539,892; 4,625,515; 6,561,596 and U.S. Pat. No. 6,732,578, a control valve is located in a first bore and a power piston is located in a second bore of a housing. A lever arrangement is connected to the power piston and the control valve. An input force applied to a brake pedal by an operator acts on the lever arrangement to develop a manual mode and a power assist mode of operation. The lever arrangement pivots on the power piston and communicates an actuation force that moves the control valve to regulate the flow of pressurize fluid from a source to an operational chamber. The regulated pressurized fluid supplied to the operational chamber acts on the power piston in the first bore to develop an operational force that pressurizes fluid that is supplied to wheel brakes to effect a corresponding brake application. A reaction force produced by regulated pressurized fluid in the movement of the power piston is transmitted back to the brake pedal to balance the input force such that the operational force supplied to move the power piston in the first bore is a function of the input force applied to the brake pedal.

Additional features such as traction control, dynamic operational control and anti-skid control under the control of an ECU have been added to hydraulic brake booster to provide a total brake system. During an ECU generated brake application, the brake pedal of the hydraulic booster may mirror the movement of the power piston. In addition, as a result of the rapid opening and closing of the control valve during a ECU generated brake application, an increase in the level of noise created as pressurized fluid flows to the actuation chamber and on released from the brake chamber may occur. Structure to hold a brake pedal stationary during an ECU generated brake application is disclosed in U.S. Pat. No. 6,203,119 wherein a control valve seat moves to meter pressurized fluid; in U.S. Pat. No. 6,732,518 where a separate piston is provided to act on the control valve to meter pressurized fluid; and in U.S. application Ser. No. 10/767, 300 wherein a sleeve acts on the control valve to meter pressurized fluid to effect a brake application but it would not appear that the creation of noise has been specifically addressed in the known prior art.

SUMMARY OF INVENTION

A advantage of the present invention resides in a control valve for a brake booster in a brake system having a shuttle member with a stem on a first end that controls the metering of pressurized fluid from a source to an actuation chamber during a brake application and a second end with an annular projection that controls metering of pressurized fluid from the actuation chamber to a reservoir on terminate the brake application such that fluid only flows in a same direction and as a result oscillation of the shuttle is attenuated and the noise level of the operation of the brake booster is reduced.

According to this invention, the brake booster has a housing with a first bore therein for retaining a power piston, a second bore therein for retaining the control valve and an actuation chamber. The control valve sequentially connects a source of pressurized fluid to the actuation chamber and a reservoir in response to an input force from an actuation arrangement. The pressurized fluid available from the source presented to the actuation chamber acts on the power piston to effect a brake application. On termination of the input force the shuttle valve controls communication of the pressurized fluid present in the actuation chamber to the reservoir. The control valve is characterized by a first cylindrical body that is located in the second bore and having a first stepped axial bore that extends from a first end to a second end. The first stepped bore has a first diameter section adjacent the first end that is separated from a second diameter section by an orifice and a shoulder that separates the second diameter section from a third diameter section that extends from the second end. The first diameter section is connected to the source of pressurized fluid while a first radial bore in the first cylindrical body connects the second diameter section with the actuation chamber and a second radial bare in the first cylindrical body connects the third diameter with the reservoir. A ball located in the first diameter section of the first cylindrical body is urged by a first spring toward a seat adjacent the orifice to define a supply chamber for pressurized fluid within the second bore. A shuttle member that is retained in the Second diameter section of the first cylindrical body has a stem on a first end that is located near the orifice and an annular projection on a second end that extends into the third diameter section of the first cylindrical body. A seal carried by the shuttle member prevents fluid communication between the second diameter and second diameter section of the first cylindrical body. An actuation piston that is retained in a bearing-spacer has an annular flange on a first end that is located in the third diameter section of the first cylindrical body and a second end that extends into the actuation chamber. The actuation piston has a second stepped axial bore that extends from the first end to the second end such that the third diameter section of the first cylindrical body is connected to the actuation chamber. A second spring that is located in the first stepped axial bore urges the second end of the shuttle member toward a first stop within the second bore to define a position of rest for the shuttle member. A third spring that is located between the second end of the shuttle member and the first end of the actuation piston urges the annular flange toward a second stop to define a position of rest for the actuation piston. With the shuttle member and actuation piston in rest positions, the actuation chamber may freely communicate with the reservoir by way of the second stepped axial bore, third diameter section and second radial bore in the first cylindrical body. An input force applied by actuation arrangement acts on the second end of the actuation piston and after overcoming the force the third spring moves the annular flange into engagement with the annular projection on the shuttle member to terminate communication to the reservoir through the second axial bore and thereafter overcomes the force of the second spring to move the stem into engagement with the ball and finally after overcoming the force of the first spring moves the ball off the seat to allow metered pressurized fluid to flow through the orifice and be communicated to the actuation chamber by way of the second diameter and first radial bore to effect a brake application. On the input force being removed from the second end of the actuation piston, the first spring moves the ball into engagement with the seat to terminate communication of pressurized fluid through the orifice while the third spring moves the flange away from the annular projection on the shuttle member to meter the flow of pressurized fluid present in the actuation chamber to the reservoir by way of the second stepped axial bore in the actuation piston, the third diameter and second radial bore in the first cylindrical member. Since the shuttle member is sealed in the second diameter section of the first cylindrical body, the flow of fluid between the orifice and the second radial bore only occurs along a flow path defined by the first radial bore, actuation chamber and second stepped axial bore and as a result of the shape of the stem and annular projection the oscillation of the shuttle member is does not oscillate within the second diameter to create noise during the operation of the brake booster.

An advantage of this invention resides in a shuttle member for a control valve having a stem on a first end and an annular projection whereby pressurized fluid is first metered on being presented to an actuation chamber and second metered on be released from the actuation chamber to a reservoir to such that movement of the shuttle member is substantially linear.

A further advantage of this invention resides in a shuttle member for a control valve wherein an end of a stem has an annular shape that transitions into a conical shape such that the flow of pressurized fluid from a source through an orifice is essentially a function of the conical shape and increased with the movement of the conical shape into the orifice.

BRIEF DESCRIPTION OF DRAWINGS

FIG. 3 is an enlarged sectional view of the control valve of FIG. 2 illustrating the shuttle member in a position of rest;

FIG. 4 is an enlarged sectional view of the stem of shuttle member for the control valve of FIG. 3;

FIG. 5 is an enlarged sectional view of the annular projection of shuttle member of FIG. 3;

DETAILED DESCRIPTION

Figure 1:
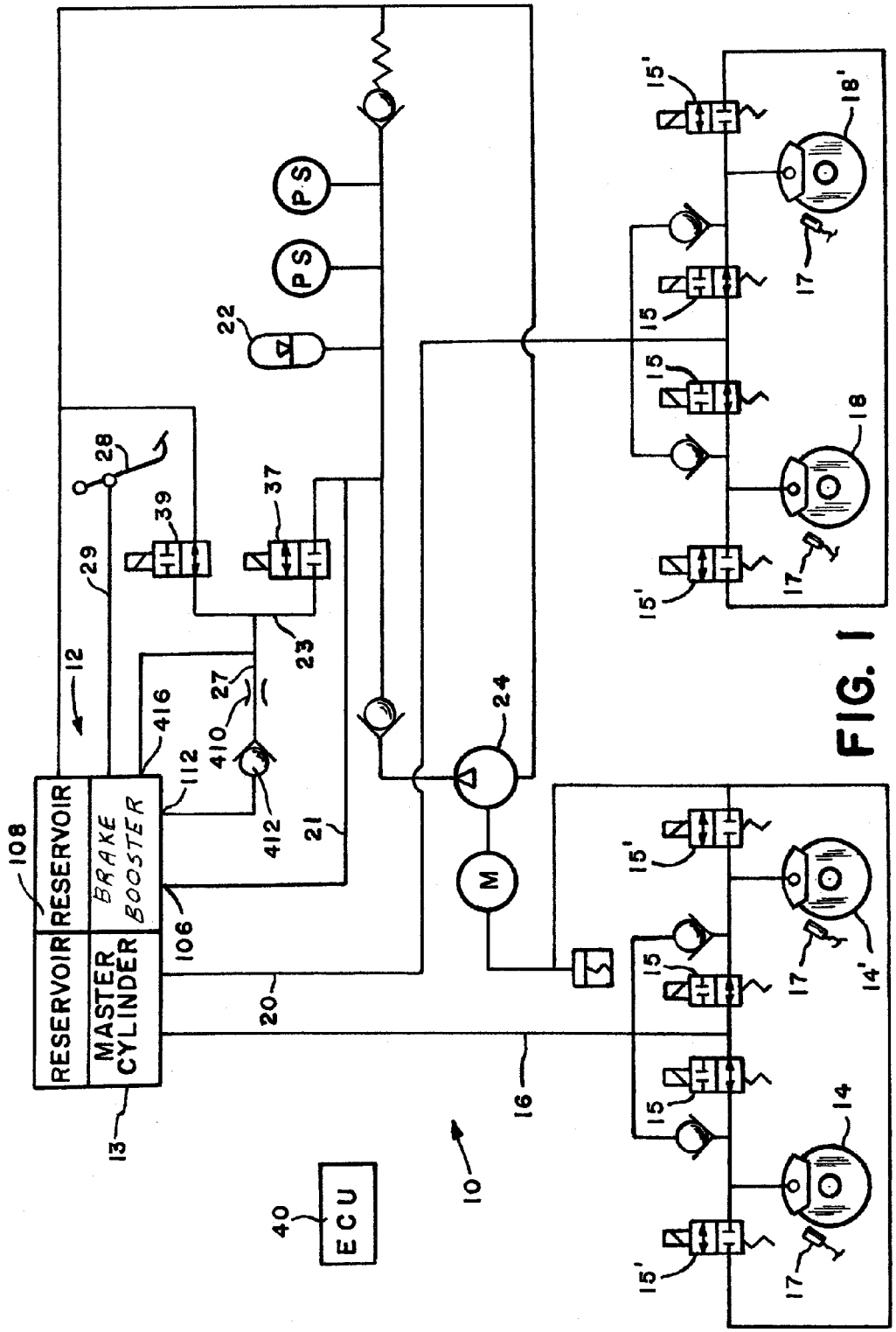
FIG. 1 is a schematic illustration of a brake system that includes a hydraulic brake booster with a shuttle member made according to the principals of the present invention.

The brake system 10 as shown in FIG. 1 and details of the components thereof shown in FIGS. 2–11, includes a hydraulic brake booster 12 for supplying a master cylinder 13 wherein an operational force derived from pressurized fluid is supplied to a first set of wheel brakes 14,14" by a first conduit 16 and to a second set of wheel brakes 18,18" by a second conduit 20 to effect a brake application. The hydraulic brake booster 12, which is commonly referred to as a closed center booster, receives pressurized supply fluid a source, either directly from a pump 24 or an accumulator 22 that is charged and maintained to a predetermined fluid pressure level by pump 24.

The brake booster 12 may function in several modes of operation including a manual mode, a boost mode, a boost plus manual mode all of which are under the control of an operator or an electronic mode that is under the control of an ECU 40. In the manual mode, a brake force from an operator is transmitted directly from the brake pedal 28 directly acts on the pistons in the master cylinder 13, in a boost mode pressurized fluid under the control of a control valve 60 is supplied to an actuator chamber that acts on a piston in the master cylinder 13, in the boost plus manual mode, once hydraulic run out is reached a manual input is added to the output force developed from the pressurized fluid of the boost mode to effect a brake application and in the electronic mode the ECU activates first 37 and second 39 solenoid valves to sequentially terminate communication between an actuation chamber 80 and a reservoir 108 to initiate communication of pressurized fluid that acts on the control valve 60 to meter pressurized fluid from a source that is simultaneously supplied to an actuation chambers 80 and 80'. In the electronic mode, the pressurized fluid supplied to the actuation chamber 80 is restricted and acts on the power piston 50 to initiate the development of an output force while the pressurized fluid in the actuation chamber 80' acts on the control valve 60 to metered pressurized fluid that acts on power piston 50 to develop an output force that corresponds to a braking force derived by the ECU 40 to meet desired operational activities of a vehicle.

Figure 2:
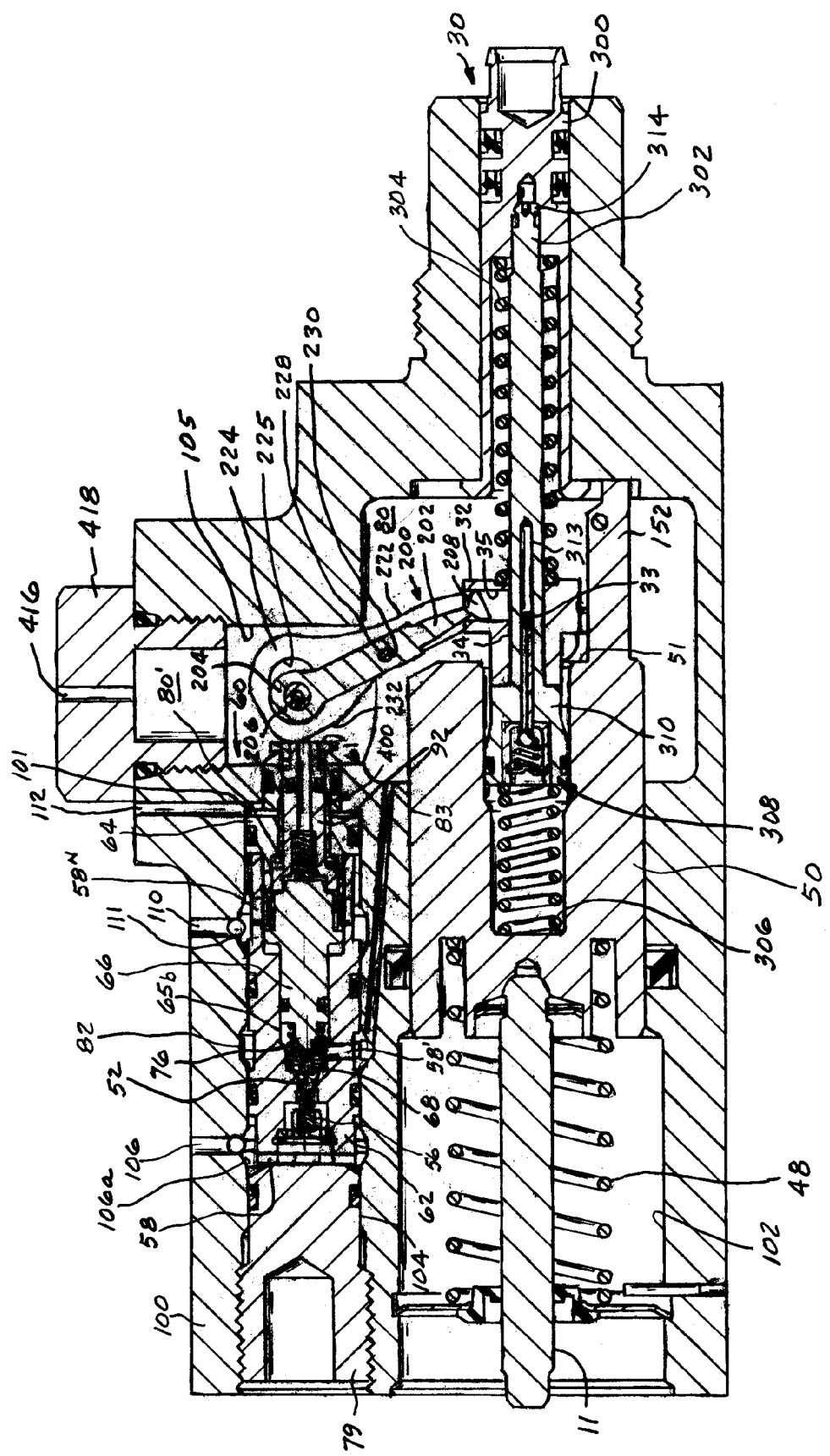
FIG. 2 is a sectional view of the hydraulic brake booster for use in the brake system of FIG. 1.
Figure 6:
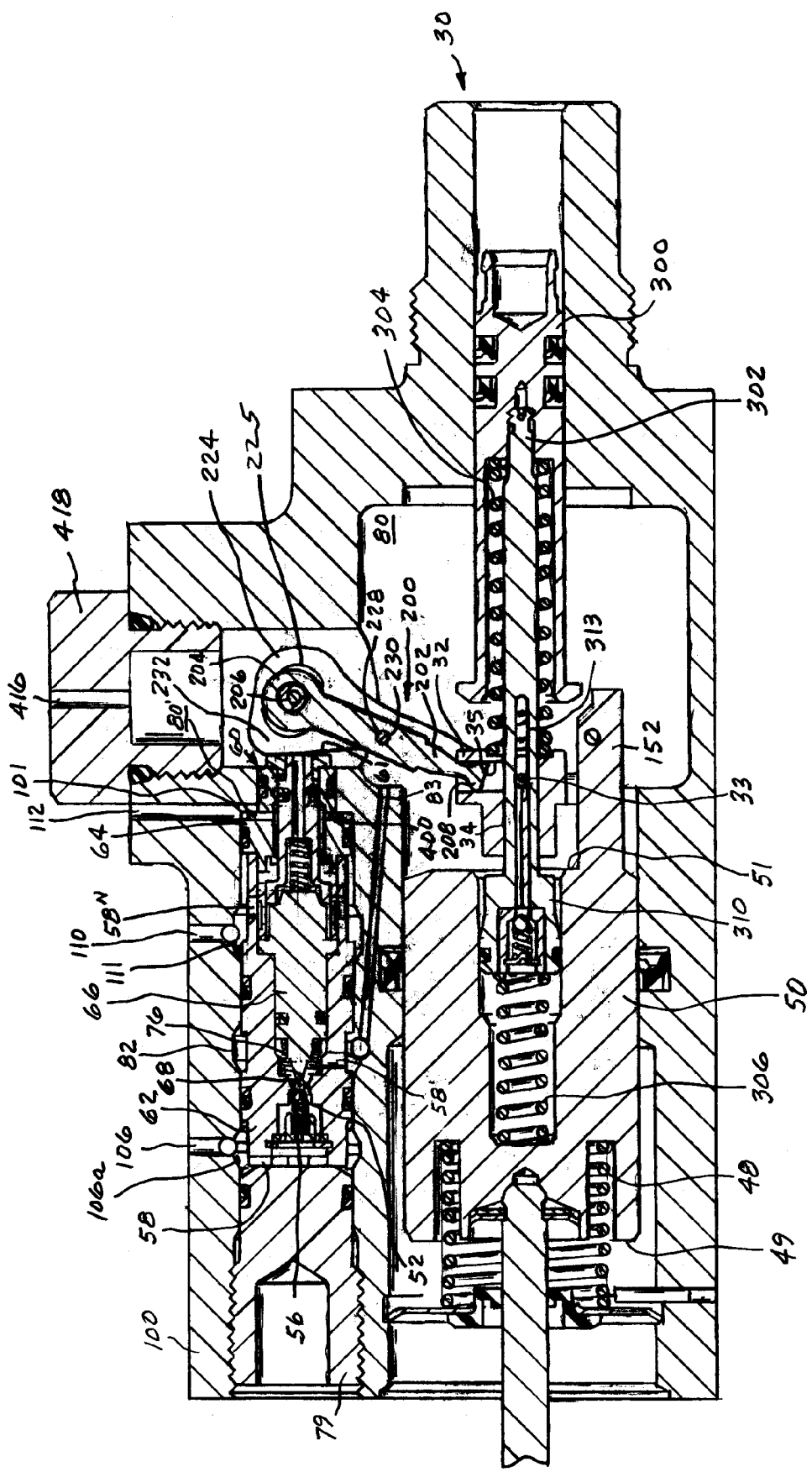
FIG. 6 is a sectional view of the hydraulic brake booster of FIG. 2 wherein the shuttle member is in an actuation position in response to an input force being applied to an actuation arrangement by an operator to effect a brake application.
Figure 10:
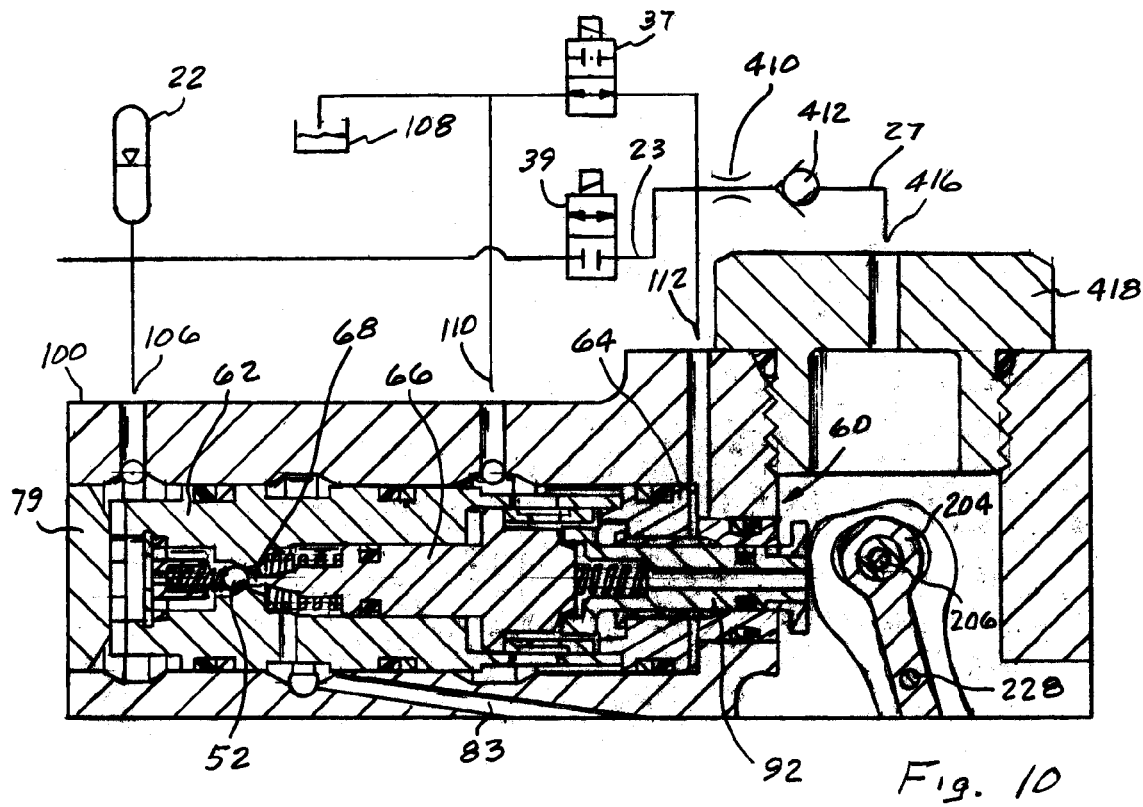
FIG. 10 is a sectional view of the control valve of FIG. 2 showing a relationship between the components of the shuttle member during movement between a position of rest and an actuation position.

In the manual or first mode, the development of a hydraulic actuation force in brake booster 12 is under the control of an operator. The operator applies a brake force to the brake pedal 28 to develop a corresponding desired braking event, and this brake force is communicated through a lever arrangement 200 to activate the control valve 60. When activated, the control valve 60 initially moves as illustrated in FIG. 10 to a position as illustrated in FIG. 6 to meters pressurized fluid that is supplied to the actuation chamber 80 for the development a corresponding actuation force on the power piston 50 to move pistons in the master cylinder 13 and pressurized fluid that is supplied to operate wheel brakes 14,14" and wheel brakes 18,18" to effect a brake application. On termination of the brake force by the operator to brake pedal 28, the components of the brake booster 12 are returned to a rest state as illustrated in FIGS. 2, 3 and 4.

Figure 11:
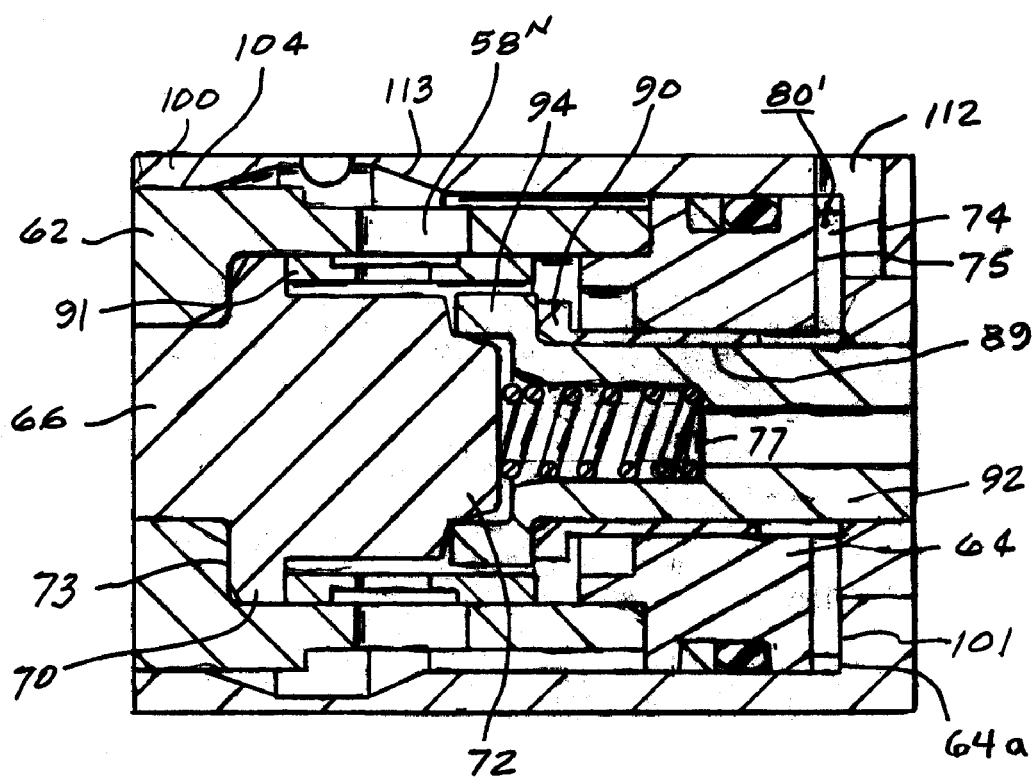
FIG. 11 is a sectional view of the annular projection shuttle member during actuation of the control valve through an input supplied under the control of an ECU.

In the electronic mode, the brake system 10 is under the control of the ECU 40. The ECU is connected to the following components in the brake system: a build solenoid valve 15; a decay solenoid valve 15"; and a wheel speed sensor 17 for each wheel in the first set of wheel brakes 14,14" and second set of wheel brakes 18,18". Each of the wheel speed sensors 17 provide the electronic control unit (ECU) 40 with an input signal relating to a current functional operational of a particular wheel of the vehicle and are evaluated other inputs and data relating to the vehicle including but not limited to: the operation of the motor pump; the pressure of the pressurized supply fluid; dynamic forces experienced by the vehicle; accumulator fluid supply pressure, the level of fluid in a reservoir and etc. that may effect the safe operation of the vehicle and the ability of achieving a desired braking application. If the ECU 40 determines after evaluating the inputs relating to the operational features or conditions currently experienced by the vehicle that a less than optimum operation situation is occurring or forthcoming, the ECU 40 is programmed to institute independent braking of the wheel brakes 14, 14" and 18,18" by transmitting an operating signal that closes normally opened solenoid valve 37 to reservoir 108 and open normally closed solenoid valve 39. When solenoid valve 39 is opened pressurized hydraulic fluid flows from the accumulator 22 and to activate actuation piston 92 and directly activate the control valve 60 of hydraulic brake booster 12 and at the same time a restricted quantity of pressurized fluid flows to actuation chamber 80. Once control valve 60 is activated, as illustrated in FIG. 11, pressurized hydraulic fluid is communicated to actuation chamber 80 and acts on the power piston 50 to create an operational force that in turn acts on pistons in the master cylinder 13 to produce pressurized fluid that is supplied to individually activate the wheel brakes 14, 14" and 18,18" in accordance with signals from the ECU 40 to effect a brake application and attenuate the less than optimum operating condition which could effect the safe operation of the vehicle.

The details of hydraulic brake booster 12 is best illustrated in FIGS. 2–11 and with the exception of control valve 60 is similar to the structure disclosed in U.S. Pat. No. 6,732,518. The brake booster includes a housing 100 with a power piston 50 that is sealingly retained in a first bore 102 and a control valve 60 that is sealingly retained in a second bore 104, an input member 30 piloted in power piston 50 and linked to the control valve 60 by the lever arrangement 200. In the boost or first mode, the lever arrangement 200 is responsive to a braking input force that is communicated from a brake pedal 28 to the input member 30 for moving the control valve 60 that meters pressurized fluid from a source, either pump 24 or accumulator 22. The metered pressurized fluid is communicated to a actuation chamber 80 in housing 100 and acts on the power piston 50 to develop a hydraulic actuation force that in turn acts on a piston in the master cylinder 13 to pressurize fluid therein that is communicated to the wheel brakes wheel brakes 14, 14' and 18,18' in a brake system 10 for effecting a corresponding brake application.

In more particular detail, the housing 100 includes a first inlet port 106 connected to supply conduit 21 for receiving pressurized hydraulic fluid either directly from pump 24 or from accumulator 22; a relief port 110 connected to a common reservoir 108 for pump 24 and master cylinder 13 and a second inlet port 112 that is connected to supply conduit 21 by conduit 23 through a normally closed solenoid valve 39 under the control of ECU 40 or a normally opened solenoid valve 37 connected to the common reservoir 108. The housing 100 has a stepped first bore 102 that extends clear through the housing 100, a stepped second bore 104 that is parallel with the first bore 102 and extends into the housing 100 from a first side until it intersects with a cross bore 105 that extends from the actuation chamber 80. Housing 100 has a first groove 106*a* through which first inlet 106 is connected to the second bore 104, a second groove 111 through which the second bore 104 is connected to the reservoir 108 and a third groove 82 through which the second bore 104 is connected by passage 83 to the actuation chamber 80 and a fourth groove 113 through which passage 112 is selectively connected to reservoir 108 and the source of pressurized fluid under the control of the ECU 40.

The control valve 60, see FIGS. 3, 4 and 5 includes a first cylindrical body 62 and a second cylindrical body 64 that are sealingly located the second bore 104. An end plug 79 that is fastened by being screwed into housing 100 holds the second cylindrical body 64 against a shoulder 101 in the housing 100 to correspondingly align radial bores or passages 58,58" . . . 58" that extend from a stepped bore 65 in the first cylindrical body 62 with groove 106*a* and inlet port 106, with groove 82 and passage 83 to actuation chamber 80, with groove 111 and relief port 110 connected with reservoir 108 and radial bore 74 that extends from the stepped axial bore 67 in the second cylindrical body 64 with groove 113 to passage 112 connected with the circuitry controlled by the ECU 40. The stepped bore 65 includes at least a first diameter 65*a*, a second diameter 65*b* and a third diameter 65*c*. The first diameter 65*a* extends from a first end 71 to an orifice 54 located between the first diameter 65*a* and the second diameter 65*b* while a shoulder 73 separates the second diameter 65*b* from the third diameter 65*c* that extends from a second end 75. Radial bore 58 is located in the first diameter 65*a*, radial bore 58' is located in the second diameter 65*b* while radial bore 58" is located in the third diameter 65*c*. With the second cylindrical body 64 against shoulder 101, an actuation chamber 80' is defined within the second cylindrical body 64 by the radial bore 74. The first cylindrical body 62 is further distinguished in that radial bore or passage 58' connects the second diameter 65*b* with passage 83 connected to actuation chamber 80 and radial passage 58$^N$ connects the third diameter 65*c* with reservoir 108.

The control valve 60 further includes a shuttle member 66, see FIGS. 3, 4 and 5 that is sealingly retained in the second diameter 65*b* of bore 65 of the first cylindrical body 62. Shuttle member 66 has a integral axial stem 68 on a first end 81*a* that functions as a needle valve within the stepped bore 65 of the first cylindrical body 62 and annular projection 72 located on a second end 81*b* that extends into the third diameter area 65*c* of the first cylindrical body 62. The shuttle member 66 is a solid cylindrical member that includes a rib 70 that is located between the first end 81*a* and the second end 81*b* and a seal 70*a* that is carried by the cylindrical body 66. The seal 70*a* engages the second diameter 65*b* and prevents the direct communication of fluid that flows through the orifice 54 to the third diameter 65*c* area of the cylindrical body 62. The annular projection 72 is defined by a conical entry surface 72*a* that transitions into a cylinder surface 72*b* adjacent a bearing and sealing surface 72*c*.

A ball 52, see FIGS. 3 and 4, is located in the first diameter 65*a* of the stepped bore 65 and is urged toward a seat 55 that surrounds orifice 54 by a spring 56. The volume within the first cylindrical body 62 bounded by seat 55, radial passage 58, groove 106*a* and the first diameter 65*a* defines a supply chamber 54*a* for pressurized fluid available from the source through conduit 21. The volume within the first cylindrical body 62 bounded by the second diameter 65*b*, orifice 54, face of the shuttle member 66 and stem 68 radial bore 58' defines an operational chamber 85 that is connected to actuation chamber 80 by passage 83.

The second cylindrical body 64, see FIGS. 3 and 5, is sealingly located in the second bore 104 with a first end 84 located in the third diameter 65*c* of the first cylindrical body 62 and a second end 85 that extends into the actuation chamber 80. The first end 84 extends into the second bore 104 a distance established by the engagement of shoulder 84*a* with shoulder 101 to set the alignment of radial bores or passages 58,58" . . . 58" with ports 106 and 110 and radial bore passage 74 with port 112. The stepped bore 67 has a first diameter 67*a* and a second diameter 67*b* such that an actuator sleeve 89 is concentrically located in the first diameter 67*a* with an inner diameter 89*a* that is matched with the second diameter 67*b* to define a uniform diameter for receiving an actuation piston 92. The sleeve 89 has a flange 90 that engages a shoulder 64a on the second cylindrical body 64 such that an end 90a is located in a secondary actuation chamber 80' formed therein.

A spacer 91, in the form of a sleeve is located in the third diameter 65c of the first cylindrical body 62 between rib 70 on shuttle member 66 and the end 84 of the second cylindrical body 64 that is located in the second bore 104 to define a stop for shuttle member 66 within the first cylindrical body 62.

A spacer 91 defined by a sleeve is located in the third diameter 65c of the first cylindrical body 62 between rib 70 on shuttle member 66 and the end of the second cylindrical body 64 located in the second bore 104 to define a stop for shuttle member 66 within the first cylindrical body 62.

The control valve 66 is further defined by an actuation piston 92 that has a cylindrical body with first end having a flange 94 thereon that is located within the third diameter 65c of the first cylindrical body 62 and a second end 61 that is located in the actuation chamber 80. The cylindrical body is concentric to an axial bore defined by the diameter 89a of sleeve 89 and diameter 67b of the second cylindrical body 64. The cylindrical body has a stepped bore 96 therein that extends from the flange 94 on the first end to the second end 61 that provides a flow path between the actuation chamber 80 and the area bounded by the third diameter bore 65c of the first cylindrical body 62.

A return spring 76 that is located in the second diameter area 65b of the first cylindrical body 62 acts on the shuttle member 66 to urge rib 70 against spacer 91 to position the second end 81b of the shuttle member 66 at a specific distance from shoulder 101 to define a rest position for the shuttle member 66. At the same time a return spring 77 that is located between the second end 81b of the shuttle member 66 and actuation piston 92 urges the flange 94 toward and into engagement with a stop provided by flange 90 and shoulder 64a to define a position of rest for the actuation piston 92.

When the shuttle member 66 and actuation piston 92 are located in a position of rest as best illustrated in FIGS. 2, 3, 4 and 5, a flow path is established between the stepped bore 96 and reservoir 108 by a space relationship of flange 94 and the conical surface 72a on projection 72 on end 81b of the shuttle member 66 such that actuation chamber 80 is freely connected to the reservoir 108.

The power piston 50 as illustrated in FIGS. 2 and 6 is sealingly located in the first bore 102 and urged toward a rest position in the actuation chamber 80 by a return spring 48. A bracket 32 that straddles a projection 152 that extend from the power piston is retained thereon by a pin 33 that passes through an axial slot 313 in a shaft 302 on the input member 30.

The input member 30 as described in U.S. Pat. No. 6,732,518 includes; a cylindrical body 300 that is sealingly located in the first bore 102; a shaft 302 that is connected to push rod 29 by way of the cylindrical body 300 that is located in bore 306 within the power piston 50; a first spring 304 that is concentric to the shaft 302; a bracket 32 that is carried on shaft 302; a second or return spring 306 that acts on shaft 302 to urges the cylindrical body 300 toward a position of rest; and a ball valve assembly 308.

The bracket 32 has a general rectangular shaped base with an axial bore 34 for receiving shaft 302 and a radial opening 35 that is retained in perpendicular plane with respect to projection 152 by a pin 33 that extends though a slot 313 in shaft 302. Bracket 32 is capable of axial movement on shaft 302 through which an input force is applied to the end 208 of lever 202 in lever arrangement 200 along a radial plane with respect to the axis of the first bore 102. When a threaded second end of shaft 302 is screwed into cylindrical body 300, spring 304 is compressed and as a result spring 304 provides a force that urges bracket 32 toward and into engagement with head 310.

The lever arrangement 200 includes a first lever 202 and a second lever 222 made up parallel arms, (only one is shown). The first lever 202 has a first end 204 that is pivotally secured in housing 100 by a first pivot pin 206 and a second end 208 with a semi-spherical surface thereon that is located in the radial opening 35 of bracket 32. The parallel arms of the second lever 222 each have a first end 224 and a second end with the first pin 206 passing through an elongated oval slot 225 in the first end 224 and the second end being aligned with the end face 51 on the power piston 50. The second lever 222 is connected to the first lever 202 by a second pivot pin 228 that sequentially extends through a first arm of the second lever 222, first lever 202 and a second arm of the second lever 222 at a fulcrum point 230 on the first lever 202. The first end 224 of the parallel arms of the second lever 222 have a cam surface 232 that engages face 61 on actuation piston 92 for the control valve 60 at a point contact while the second end of the parallel arms 222 have an arcuate surface that define a point contact with the end face 51 of operational power piston 50 such that return spring 306 transmits a force through bracket 32 to end 208 of the first lever 202 to hold the cam surface 232 against face 61 and hold the arcuate surface on the second end of lever 222 against the end face 51 on the power piston 50. The fulcrum point 230 on the first lever 202 is selected such that as first lever 202 pivots in an arc about pivot pin 206, an actuation force that is applied to the second lever 222 is balanced between the first end 224 and the second end that engages the power piston 50.

The lever arrangement 200 has a first length defined by a distance between the first pin 206 and the second end 208 on the first lever 202 and a second length defined by a distance between the first pin 206 and the second end of the second lever 222 that engages the power piston 50 such that the axial movement of the cylindrical body 300 and the power piston 50 is defined by a ratio of the first length to the second length. Thus, a hydraulic output force developed by metered pressurized fluid presented to the actuation chamber 80 by way of the control valve is proportional to an input force applied to brake pedal 28.

The brake booster 12 is designed to include a hydraulic actuator arrangement 400 that is under the control of the ECU 40 to achieve an independent electronic mode of operation. Hydraulic actuator arrangement 400, see FIG. 11, includes sleeve 89 that surrounds actuation piston 92 of the control valve 66. Sleeve 89 has a flange or lip 90 that engages shoulder 64a on the second cylindrical member 64 to position a second end 90a thereon in actuation chamber 80' defined by the second cylindrical member 64 within the second bore 104. The hydraulic actuator 400 further includes a restrictive orifice or bleed 410 that is located in conduit 27 that is connected to lead 23 through which solenoid valve 39 is connected to passage 112 and a one-way check valve 412 located between the orifice 410 and a port 416 in access port cap 418 for chamber 80 in housing 100, see FIG. 1. With the one-way way check valve 412 in conduit 27 communication of fluid pressure between actuation chamber 80 and reservoir 108 is inhibited and as a result functional operation in an electronic mode is strictly under the control of ECU 40.

OPERATION OF THE BRAKE BOOSTER

For a given vehicle, the operational force developed by an input force applied to a brake booster to meet operational braking parameters is effected by several factors including weight of the vehicle, size of the power piston in the brake booster and the available hydraulic fluid pressure developed by a source. Only after the parameters have been defined are the component parts that make up a brake system selected. For instance in a brake system equipped with a hydraulic brake booster 12, a gain or ratio is selected to define a relationship between the input force applied to the brake pedal 28 by an operator and the operational force developed by metering pressurized fluid to the actuation chamber 80 to act on a power piston 50. In the lever arrangement 200 for brake booster 12, the location of the fulcrum point 230 on the first lever 202 is selected such a balanced force is applied to the first 224 and second ends of the second lever 222 and in activating the control valve 60 to meter pressurized fluid to the actuation chamber 80. In this brake booster 12, the resulting hydraulic force applied to the power piston 50 is proportional to the input force applied by an operator to the input member 30 to effect a brake application.

Figure 9:
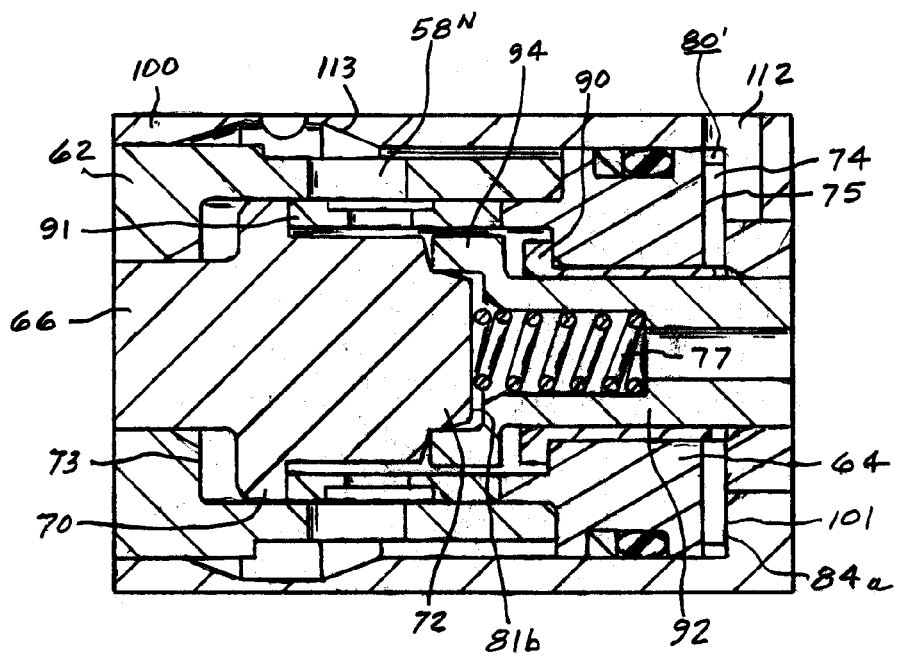
FIG. 9 is an enlarged sectional view of the annular projection of the shuttle valve of FIG. 7.
Figure 7:
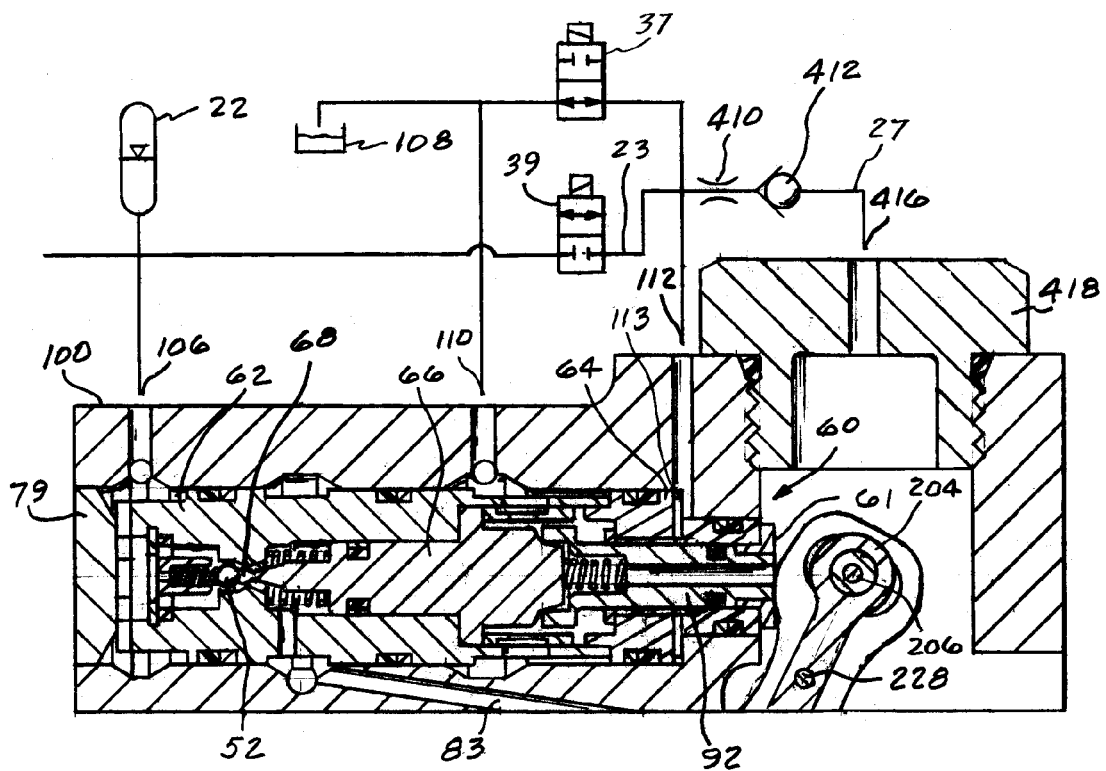
FIG. 7 is an enlarged sectional view of the control valve of FIG. 6.
Figure 8:
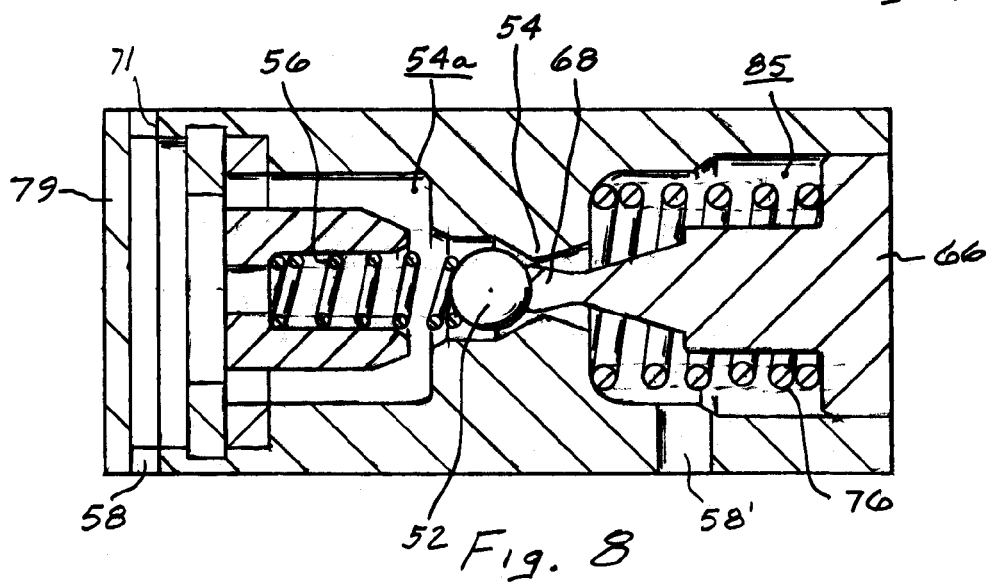
FIG. 8 is an enlarged sectional view of the stem of the shuttle member of FIG. 7.

In more detail, when an operator desires to effect a brake application in a vehicle having a hydraulic brake booster 12 as shown in FIG. 2 an input force applied to brake pedal 28 that is communicated through input push rod 29 to move input member 30 that includes the cylindrical body 300, head 310 on stem 302 and bracket 32 all of which move in a direction toward power piston 50. Movement of the bracket 32 causes that end 208 of lever 202 to pivot about pin 206 and impart an actuation force through pin 228 at fulcrum 230. The actuation force at pin 228 is applied through the arms of the second lever 222 such that half of the actuation force is applied to end or face 61 on actuation piston 92 by way of cam surface 232 and the other half is applied to the end face 51 of the power piston 50 through the second end of the second lever 222. The actuation force applied to actuation piston 92 after overcoming return spring 77 moves flange 94 toward the conical surface 72a and into engagement with cylindrical surface 72b to terminate communication between axial bore 96 and the reservoir 108 as illustrated in FIGS. 9 and 10 and with further movement flange 94 engages bearing surface 72c and after overcoming the force of return spring 76 moves the shuttle member 66 such that end 81 on stem 68 engages ball 52 and after overcoming the force of spring 56 moves ball 52 away from seat 55 as illustrated in FIGS. 6,7 and 8 such that pressurized fluid flows from chamber 54a through orifice 54 into the operational chamber 85 within the second diameter area 65b of the first cylindrical body 64 and out radial bore 58' to actuation chamber 80 by way of passage 83. The metered pressurized supply fluid presented to chamber 80 acts on the second end 51 of piston 50 to create an operational force that is communicated through output push rod 11 to act on pistons in the master cylinder 13 and correspondingly pressurize fluid therein that is supplied through conduits 16 and 20 to effect a brake application in wheel brakes 14,14' and 18,18'. The flow of the pressurized fluid through the orifice 54 is defined by a space relationship between the cylindrical surface on stem and the conical surface on stem 68 such that metered pressurized fluid flow through the orifice 54 increases as a linear function of the movement of shuttle member 66 in response to an input force applied to the actuation piston 92. Depending on the application, this linear function could be modified by changing the length of the cylindrical surface 68a and/or the pitch of the conical surface 68b.

On termination of the input force to brake pedal 28, the component are returned to a position of rest as shown in FIGS. 2 and 3 such that actuation chamber 80 is in free communication with reservoir 108.

In returning the control valve 60 to the position of rest, the input force on end 61 of the actuation piston 92 is removed and spring 56 acts to move ball 52 against seat 55 to terminate the flow of pressurized fluid through orifice 54. With ball 52 on seat 55, the fluid pressure differential across shuttle member 66 is now essentially equal and as a result return spring 77 moves flange 94 into engagement with a stop defined by flange 90 on sleeve 89 and shoulder 64a to open communication between flange 94 and the annular projection 72 on the second end 81b of the shuttle member 66. The fluid pressure in the actuation chamber 80 is reduced by flow of fluid to reservoir 108 causing the pressure differential across the shuttle member 66 to be correspondingly reduced such that return spring 76 may now move rib 70 toward and into engagement with a stop defined by spacer 91 and the first end of the second cylindrical member 64 as illustrated in FIGS. 3 and 5 such that chamber 80 is in free communication with reservoir 108. The flow of fluid from actuation chamber 80 is under the control of the end 81b of the shuttle member 66 and is metered by the space relationship between the conical surface 72a on the annular projection 72 and as a result flow occurs in a manner such that oscillation of the shuttle member 66 is essentially non-existent and any noise resulting from the flow of fluid to the reservoir 108 is minimal and does not add to the operational noise of the hydraulic brake system.

The control valve 60 functions in the following manner. When hydraulic run out for brake booster 12 occurs, shuttle member 66 will have moved ball 52 completely away from seat 55 and the apex 68a of conical surface will be aligned with the orifice 54 as rib 70 engages shoulder on the first cylindrical body 62. When rib 70 engages shoulder, the lever arrangement 200 is aligned such that bracket 34 separates from head 310. In this situation, further operational output force may be achieved through an input force applied to cylindrical body 300 as the input force is directly transferred into power piston 50 and added to the output force produced by the pressurized fluid in actuation chamber 80 to produce an output force based on boost mode plus manual mode.

In event that the pressurized fluid from the supply is unavailable, the brake booster 12 is under a manual control mode. An input force that is applied to brake pedal 28 can be used to pressurize the pistons in master cylinder 13. An input force applied to input member 30 moves the cylindrical member 300 and bracket 32 associated therewith such that end 208 of lever 202 pivots on pin 206 and imparts an actuation force through pin 228 to the second lever 222 to activate the control valve 60. As in a power assist, the actuation force is communicated through cam surface 232 into end 61 of the actuation piston 92 and the actuation piston 92 moves to initially close relief port 110 by seating flange 94 on cylindrical surface 72b and bearing surface 72c and when flange 94 engages bearing surface 72c the shuttle member 66 moves such the stem 68 moves ball 52 off of seat 55 to prevent a hydraulic lock that would be adverse to movement of the power piston 50 within bore 102. Since no pressurized supply fluid is available, the input force on input member 30 continues to move cylindrical member 300 and shaft 302 toward power piston 50 and eventually the first lever 202 engages housing 100 such that the bracket 34 thereafter remains mains stationary and head 310 separates from bracket 34 compress spring 321 and engage power piston 50 to define a direct link between the power piston 50 and input member 30 such that the input force applied to pedal 28 is communicated to push rod 11 to pressurize fluid in the master cylinder 13 to effect a brake application.

The hydraulic booster 12 for the brake system 10 may also be activated through an electronic mode under the control of the ECU 40. The ECU 40 has a capability to independently effect a brake application should inputs from the various sensors relating to the operation of the vehicle indicate that a brake application should be performed to meet or maintain desired operating condition for a vehicle. The ECU 40 initiates the electronic mode by the ECU 40 supplying signals that sequentially close the normally opened solenoid valve 39 and open the normally closed solenoid valve 37 as shown in FIG. 1, such that supply fluid available in conduit 21 is communicated to actuation chamber 80' through passage 112 and to actuation 80 through conduit 27 by way of restricted orifice 410 and one-way check valve 412 to port 416 and port 112. The restricted pressurized fluid communicated through restricted orifice 410 to actuation chamber 80 immediately increases the fluid pressure level in chamber 80 to the restricted fluid pressure level and acts on the power piston 50 to initiate a brake application while at the same time the full level of the pressurized fluid communicated to the actuation chamber 80' acts on the second end 90a of sleeve 89 to move the flange 90 off of shoulder 64a and move flange 94 toward the annular projection 72 to restrict the flow of fluid with respect to conical surface 72a and finally into a sealing engagement with cylindrical surface 72b to interrupt communication from axial bore 96 to the reservoir 108, as illustrated in FIG. 11. As the fluid pressure continues to build in actuation chamber 80' the shuttle member 66 moves toward ball 52 such that stem 68 eventually moves ball off seat 55 to permit metered pressurized fluid to be communicated to chamber 80 by way of passage 83 as illustrated in FIGS. 6 and 8 to effect a brake application. The metered pressurized supply fluid in chamber 80 is added to the pressurize level of the restricted pressurized fluid therein to act on the second end 51 of piston 50 to create an operational force that is communicated through output push rod 11 to act on pistons in the master cylinder 13 and correspondingly pressurize fluid therein that is supplied through conduits 16 and 20 to effect an independent second brake application in wheel brakes 14,14" and 18,18".

When the ECU 40 determines a reduction in the fluid pressure in the actuation chamber 80 is desirable to meet a change in operational characteristics, a signal is supplied to maintain solenoid valve 39 in an opened condition while a pulsed signal is supplied to solenoid valve 37 in a selectively allow pressurized fluid supplied to the actuation chamber 80' to be communicated to reservoir 108, as illustrated in FIGS. 2 and 3.

The hydraulic brake booster 10 is distinguished in that the flow of pressurized fluid presented to inlet port 106 that is metered by control valve 60 as it passes through the orifice 54 before being presented to actuation chamber 80 through passage 83 and returned to the reservoir 108 by flowing through axial bore 96 before being metered by the restriction formed between annular projection 72 on shuttle member 66 and flange 94 in flowing to relief port 110 is always in a same direction and as a result the creation of noise by such flow is essentially non existent.

We claim:

1. A control valve of a hydraulic brake booster for use in a brake system, said brake booster having a housing with a first bore therein for retaining a power piston, a second bore therein for retaining the control valve and an actuation chamber, said second bore being connected to a source of pressurized fluid, a reservoir and the actuation chamber, said control valve being responsive to an input force from an actuation arrangement for controlling communicating of pressurized fluid available from said source to said actuation chamber that acts on the power piston to effect a brake application and on termination of said input force for controlling communicating of the pressurized fluid present in said actuation chamber to said reservoir; said control valve being characterized by a first cylindrical body located in said second bore, said first cylindrical body having a first stepped axial bore that extends from a first end to a second end, said first stepped bore including a first diameter section adjacent said first end that is separated from a second diameter section by an orifice and a shoulder that separates said second diameter section from a third diameter section adjacent said second end; said first diameter section being connected to said source of pressurized fluid while a first radial bore in said first cylindrical body connects said second diameter section with said actuation chamber and a second radial bore in said first cylindrical body connects said third diameter with said reservoir; a ball located in said first diameter section of said first cylindrical body and a first spring for urging said ball toward a seat adjacent said orifice to define a supply chamber for pressurized fluid within said second bore; a shuttle member that is retained in said second diameter section and having a stem on a first end thereof that is located near said orifice and an annular projection on a second end thereof that extends into said third diameter section of said first cylindrical body; an actuation piston retained in said second bore having an annular flange on a first end thereof that is located in said third diameter section of said first cylindrical body and a second end thereof that extends into said actuation chamber, a second cylindrical body located in said second bore that has a second stepped axial bore that extends from said first end to said second end; a second spring that is located in said first stepped axial bore for urging said second end of said shuttle member thereon toward a first stop within said second bore to define a position of rest for said shuttle member; and a third spring located between said second end of said shuttle member and said first end of said actuation piston for urging said annular flange toward a second stop to define a position of rest for said actuation piston where said actuation chamber may freely communicate with said reservoir by way of said second stepped axial bore and said third diameter section and second radial bore in said first cylindrical body, said input force from said actuation arrangement on being applied to said second end of said actuation piston and after overcoming the force said third spring moves said annular flange into engagement with said second end of said shuttle member to terminate communication to said reservoir through said second axial bore and thereafter overcoming the force of said second spring moving said stem into engagement with said ball and after thereafter overcoming the force of said first spring moving said ball off said seat to allow metered pressurized fluid to be communicated to said actuation chamber by way of said orifice, second diameter bore and first radial bore to effect a brake application and on said input force being removed from said second end of said actuation piston said first spring moving said ball into engagement with said seat to terminate communication of pressurized fluid through said orifice while said third spring moves said flange away from said second end of said shuttle member to meter flow of pressurized fluid second present in said actuation chamber to said reservoir by way of said second stepped axial bore in said actuation piston, said third diameter and second radial bore in said first cylindrical member.

2. The control valve as recited in claim 1 wherein said metered pressurized fluid flow through said orifice increases in a substantially linear function during movement of said shuttle member by said input force applied to said actuation piston.

3. The control valve as recited in claim 2 wherein said stem of said shuttle member is characterized by a linear diameter surface that extends a first distance from said first end to a transition point and thereafter a conical diameter surface such that after the transition point passes through the orifice the space relationship between the conical diameter surface and the orifice creates said increases in the flow of pressurized fluid being supplied to said actuation chamber.

4. The control valve as recited in claim 3 wherein said shuttle member is characterized by an annular rib located adjacent said second end, said annular rib engaging said shoulder on said first cylindrical member to limit the movement of said stem into said orifice and correspondingly the communication of pressurized fluid to said actuation chamber.

5. The control valve as recited in claim 4 wherein said annular projection of said second end of said shuttle member is characterized by a conical entry surface that transitions into a cylindrical surface, said annular flange on said actuation piston being aligned with said conical entry surface to provide communication path between said second stepped axial bore and said third diameter of said first cylindrical body such that metered pressurized fluid flows from said actuation chamber to said reservoir.

6. The control valve as recited in claim 5 further characterized in that said annular flange engages said cylindrical surface to seal said second stepped axial bore from said third diameter on movement of said actuation piston by said input force.

7. The control valve as recited in claim 5 wherein said first stop is characterized by a sleeve member located in said second stepped axial bore, said sleeve member having a length to set a distance between said conical entry surface and said annular flange to provide for open communication between said second stepped axial bore and said third diameter.

8. The control valve as recited in claim 7 characterized by an annular spacer located within said second bore to define a second stop, said annular spacer being concentric with said actuation piston end having a shoulder toward which said third spring urges said annular flange to assist in defining said flow path to permit open communication between said second stepped axial bore and said third diameter during periods of rest.

9. The control valve as recited in claim 8 is further characterized by a second sleeve located within said second cylindrical body with a first end having a second flange thereon that is located between said first annular flange on said actuator piston and a shoulder on said second cylindrical body and a second end located in a second chamber within said second bore that is connected to a source of pressurized fluid.

10. The control valve as recited in claim 9 wherein said second end of second sleeve responds to pressurized fluid by moving within said second cylindrical body to provide a force to move said first annular flange on said actuator piston and correspondingly said shuttle member to effect a brake application.

11. A control valve of a hydraulic brake booster for use in a brake system, said brake booster having a housing with a first bore therein for retaining a power piston, a second bore therein for retaining the control valve and an actuation chamber, said second bore being connected to a source of pressurized fluid, a reservoir and the actuation chamber, said control valve being responsive to an input force from an actuation arrangement for controlling communicating of pressurized fluid available from said source to said actuation chamber that acts on the power piston to effect a brake application and on termination of said input force for controlling communicating of the pressurized fluid present in said actuation chamber to said reservoir; said control valve being characterized by a shuttle member that is sealingly retained in said second bore and having a stem on a first end that is located near an orifice through which pressurized fluid is communicated to the actuation chamber as a function of movement of said shuttle member and an annular projection on a second end; a cylindrical body retained in said second bore with a flange on a first end that is located in said second bore and a second end that is connected to said actuation chamber with an axial bore that extends from said first end to said second end; a first return spring for urging said second end of said shuttle member toward a first stop within said second bore to define a position of rest for said shuttle member; and a second return spring located between said shuttle member and said cylindrical body for urging said flange toward a second stop to define a position of rest for said cylindrical body where said actuation chamber is in free communication with said reservoir by way of said axial bore and said second bore, said input force from said actuation arrangement on being applied to said second end of said cylindrical body and after overcoming the force said second return spring moving said flange into engagement with said annular projection of said shuttle member to terminate communication through said axial bore to said reservoir and thereafter overcoming the force of said first return spring moving said stem into said orifice and into engagement with a ball and then after overcoming the force of a valve spring moving said ball off a seat to allow metered pressurized fluid to be communicated to said actuation chamber by way of said orifice to effect a brake application and on said input force being removed from said cylindrical body said valve spring moving said ball into engagement with said seat to terminate communication of pressurized fluid through said orifice while said second return spring moves said flange away from said annular projection on said shuffle member to meter flow of pressurized fluid present in said actuation chamber to said reservoir by way of said axial bore such that flow of fluid is always in a same direction from said orifice toward said axial bore to attenuate the introduction of oscillatory forces into the shuttle member that may create noise.

12. The control valve as recited in claim 11 wherein said stem of said shuttle valve is characterized by a linear diameter surface that extends a first distance from said first end to a transition paint of a conical diameter surface such that after the transition point passes through the orifice a space relationship between the conical diameter surface and the orifice creates an increase in the flow of pressurized fluid being supplied to said actuation chamber.

13. The control valve as recited in claim 12 wherein said shuffle member is further characterized by an annular rib located adjacent said second end, said annular rib engaging a shoulder within said second bore to limit the movement of said stem into said orifice and correspondingly the communication of pressurized fluid to said actuation chamber.

14. The control valve as recited in claim 13 wherein said annular projection is characterized by a conical entry surface that transitions into a cylindrical surface, said flange on said cylindrical body being aligned with said conical entry surface such that a flow path occurs between said axial bore and said reservoir in said position of rest for said cylindrical body and metered pressurized fluid flows from said actuation chamber to said reservoir upon termination of a brake application.

15. The control valve as recited in claim 14 further characterized in that said flange engages said cylindrical surface on said annular projection to seal said axial bore from said reservoir on movement of said cylindrical body by said input force.

* * * * *